United States Patent Office 2,768,642
Patented Oct. 30, 1956

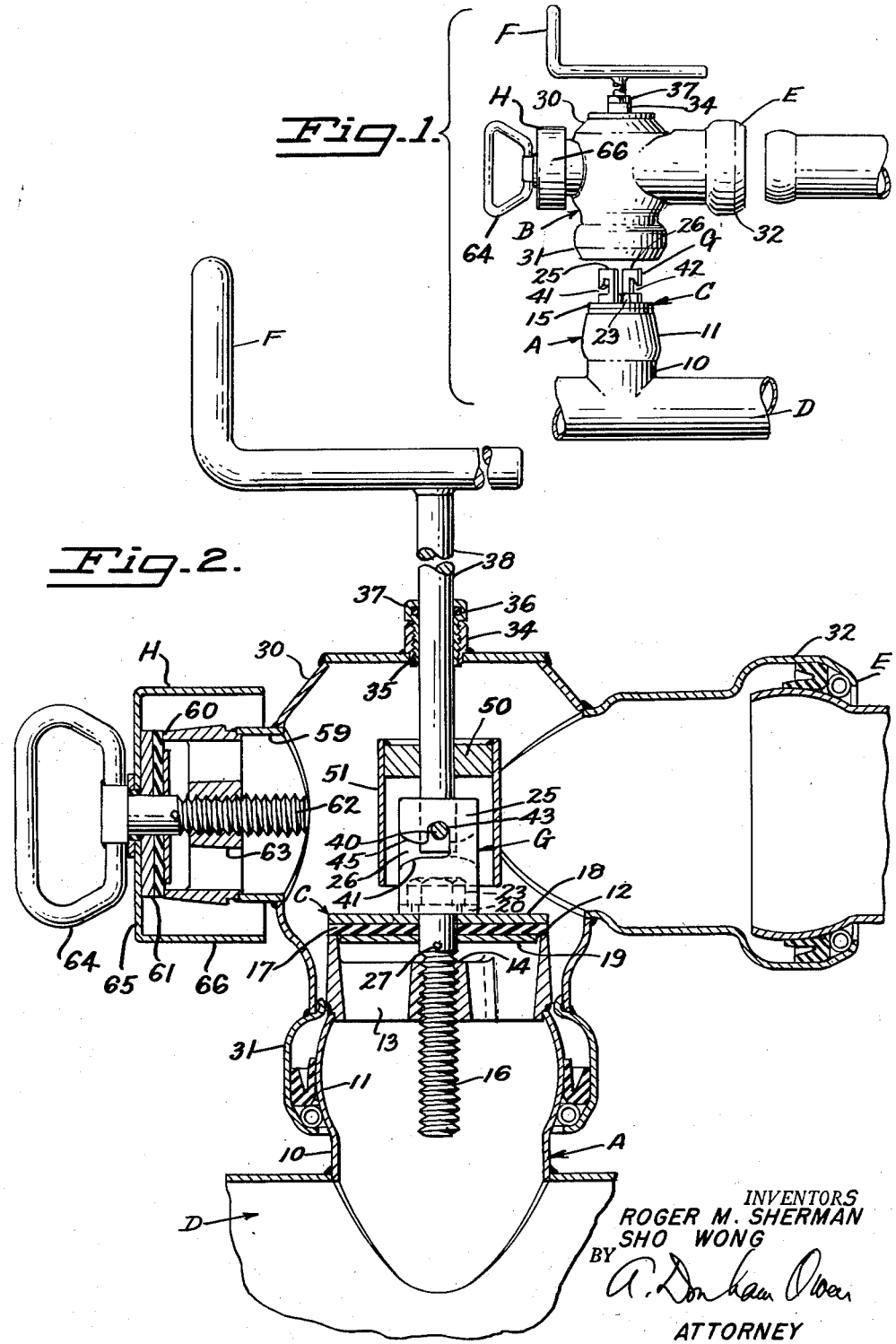

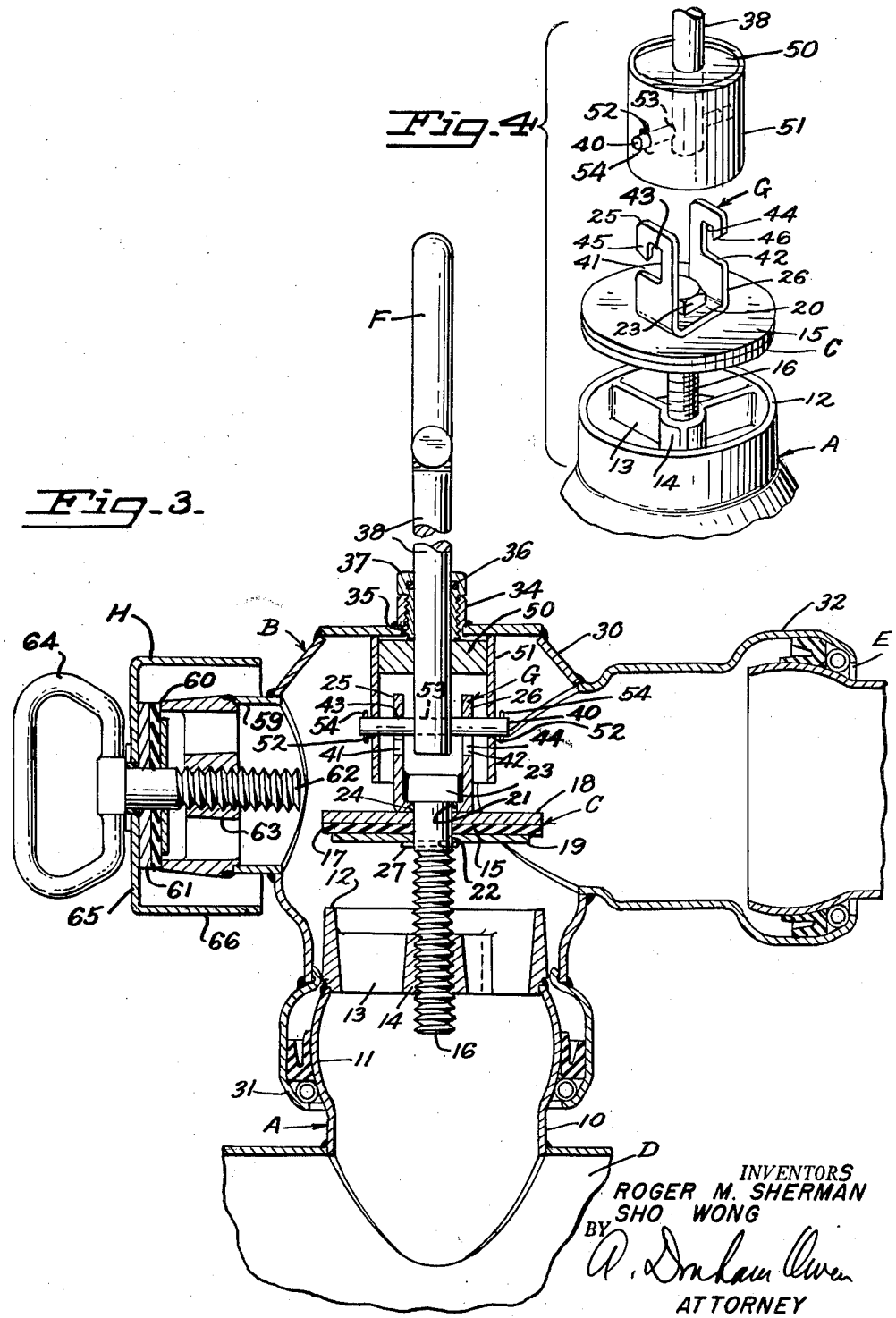

2,768,642

DETACHABLE HYDRANT

Roger M. Sherman, Palo Alto, and Sho Wong, San Francisco, Calif., assignors to W. R. Ames Company, San Francisco, Calif., a corporation of California Application March 17, 1953, Serial No. 342,792

1 Claim. (Cl. 137—321)

This invention relates to an improved detachable hydrant for use with portable irrigation pipe and the like. More particularly, the hydrant of this invention is of the type in which the hydrant spout and a valve-opening handle may be detached from the hydrant valve itself when the valve is closed. In this way, a single spout may be moved from valve to valve along the water main to form a hydrant and permit connection of a string of pipe to the water main wherever there is a valve.

In prior art devices of this general type, there was a problem in obtaining the proper engagement between the valve-opening handle and the socket with which the handle engaged on the valve. Once the valve had been partly opened, the pressure of the water coming through the valve tended to force the handle away from and out of engagement with the socket, so that it became very difficult to open the valve more widely or to close it. The handle lug had to be held in place by manually applied force, and once it had been allowed to come out of the socket (as it usually was while the water was running through the hydrant) it was difficult to get it back in engagement and keep it there while turning off the water.

The present invention has solved this problem by making use of the water pressure inside the hydrant bell plus a novel linkage between the hydrant valve socket and the handle lug, so that when the water pressure is on, the handle is securely and automatically locked to the socket and cannot easily be removed so long as the pressure is on. When the valve is closed, the water pressure is off and the handle can be disconnected. A positive safety lock is thereby provided that increases the practicality of detachable hydrants.

There has also been a problem in the fact that the connection between the handle lug and the hydrant valve socket must be made "blind," because these parts are obscured from view by the hydrant cover or housing. As a result, the handle lug has sometimes engaged only one of two notches (where the socket is bifurcated) and then has been pushed entirely out of engagement by the water pressure against it. This invention has solved this problem by providing a novel form of locating means, comprising a cylindrical collar or sleeve that is on the handle around the lug and encircles the socket when the lug is properly positioned. Otherwise, it prevents the lug from assuming any position except the proper one by engaging the socket and interfering with movement of the handle except when the parts are properly positioned.

Another problem in detachable hydrants has been that they and the pipes connected to the hydrant spout have tended to remain filled with water after the hydrant has been turned off, particularly when the hydrant is in a hollow and is lower than the adjacent pipe. The water pressure inside the hydrant has prevented the uncoupling of the hydrant and of the pipes, and it has taken considerable time for this water to drain out, if it did drain at all. The present invention has also solved this problem by providing a manually controlled drain valve in the hydrant housing, which can readily be opened for a rapid draining of the hydrant.

Other objects and advantages of the invention such as its simplicity and economy of manufacture will appear from the following description of a preferred embodiment thereof, presented in accordance with 35 U. S. C. 112. It is to be understood, however, that the invention is not to be narrowly limited to the described details, which are given as illustrative examples.

In the drawings:

Fig. 1 is an exploded view in side elevation showing a detachable hydrant embodying the principles of the invention, about to be lowered onto the closure valve in the water main and with a string of pipe indicated adjacent the outlet of the hydrant ready to be connected.

Fig. 2 is a view in elevation and in section, enlarged with respect to Fig. 1, showing the hydrant parts coupled together in their fully assembled position, but with the closure valve in its closed position.

Fig. 3 is a view generally similar to Fig. 2 showing the hydrant valve in its open position.

Fig. 4 is a fragmentary exploded view in perspective showing the hydrant valve open, but with the handle lug positioned above the socket in order to show more clearly one form of connecting structure.

The hydrant of the present invention comprises a lower housing portion A and an upper housing cover portion B. The lower portion A includes the valve C and is permanently secured to the water main D. The upper removable cover portion B includes the spout E and the handle F, whose lug engages a socket G on the valve C so that the handle F can be used to open and close the valve C. A drain valve H is also provided in the cover portion B. Practically all the parts, except where otherwise noted, may be made from thin-walled aluminum or steel tubing, of the type from which portable irrigation pipe is usually made.

The lower hydrant housing portion A includes a riser 10 extending out from the water main D and terminating in a male coupler member 11 with a valve seat 12. The valve seat 12 may be a machined tube portion somewhat heavier and more rigid than the thin-walled tubing and having a perforate spider 13 with an axially-extending, internally-threaded opening 14 welded to it.

In addition to the seat 12, the valve includes the closure member 15 that may be moved away from or toward and against the valve seat 12 by means of a bolt or cap screw 16 threaded in the spider opening 14. The valve closure member 15 preferably includes an annular rubber gasket 17 held between two rigid annular plates 18 and 19. The outer plate 18 is approximately the same diameter as the gasket 17, while the inner plate is smaller, so that it will fit inside the seat 12 when the gasket 17 is on its seat.

The U shaped socket member G has a central portion 20 that rests against the outer surface of the outer plate 18. A central opening 21 through the portion 20 is larger than and axially aligned with the opening 22 through the valve closure member 15, and the bolt 16 passes through both openings. The head 23 of the bolt 16 compresses a rubber washer 24 in the opening 21 snugly against the outer valve plate 18, so as to prevent leaks out through the openings 21 and 22, while the two side leg portions 25, 26 of the socket G extend out perpendicularly from opposite sides of the central portion 20, at a distance apart barely larger than the bolt head 23, so that the bolt 16 and socket G are keyed for movement together. A cotter pin 27 extends transversely through a hole in the bolt 16 just below the inner face of the inner valve plate 19. Therefore, whenever the socket G is turned, the bolt 16 is turned, and the valve closure member 15 is moved toward or away from the valve seat 12. The member 15 is free to rotate in respect to the bolt 16.

The detachable upper hydrant portion B includes a hollow housing 30, preferably shaped as an elbow; with a female coupler 31 on its lower side adapted to embrace the male coupler element 11 when the upper and lower hydrant portions A and B are secured together. The side opening may comprise a female coupler 32 of any suitable type, or, for some uses, it may comprise a simple spout from which the water may pour into an irrigation ditch. Opposite the coupler 32 is the drain valve H, discussed later in detail.

Any detachable upper hydrant portion B can be coupled to any lower hydrant portion A, and, when the valve C is closed, can be uncoupled therefrom. In this way a single upper hydrant cover portion B can be used at each of a variety of valve locations along a water main. This avoids the cumbersomeness of having a complete hydrant at each take off valve along the main. Furthermore, only a portion of the total number of hydrant valve connections A will be in use at any one time.

The crank F which actuates the valve C by engagement with the socket G, extends through a stuffing box 34 provided in a hole 35 in the housing 30. The sealing element proper comprises an O-ring 36 positioned in the interior stuffing tube 37, which is threaded into the box member 34. The smooth shaft portion 38 of the crank F slides in the stuffing box. It is held inside the housing 30 by a transverse pin or lug 40 secured near its inner end. When the valve is opened and the housing 30 is filled with water under pressure, the effect is for the crank portion 38 to behave like a piston and to move outwardly. This effect is an important aspect of the operation of the invention.

The pin or lug 40 is adapted to be removably engaged in a pair of symmetric notches 41 and 42 formed in the arms 25, 26 of the socket G. The notches 41 and 42 open on opposite sides, and extend radially transversely inwardly, about halfway across their respective arms 25, 26. Each notch 41, 42 has an upwardly generally axially extending open portion 43, 44, formed by the depending portions 45, 46. When fluid pressure in the housing 30 causes the crank portion 38 to move like a piston this brings the pin 40 up into the axially extending notch portions 43, 44, where it is locked so long as the fluid pressure is on. The connection is therefore ideal for rotating the socket G, the bolt 16, and for opening and closing the valve C.

Surrounding the lug 40 is a structure which insures the proper positioning of the crank 38 so that the lug 40 will engage the socket G in exactly the right position, where it will fit in both notches 41 and 42 and not just in one of them. This structure includes a guide disc 50, slidably mounted on the shaft 38 and provided with a depending cylindrical sleeve, collar, or skirt 51, which may be a tube or pipe welded or otherwise secured to the disc 50. The diameters of the disc 50 and the skirt 51 are so proportioned that the skirt 51 will readily fit around the socket arms 25, 26, with adequate clearance for free movement, but the fit should be close enough so that the proper centering will be insured. The length of the lug or pin 40 is greater than the diameter of the skirt 51, so that the lug projects out through diametrically opposite openings 52 in the skirt 51.

The assembly of this lug-skirt combination is begun by sliding the disc 50 on the shaft 38 before the lug 40 is inserted. Then the lug 40 is put in through one of the openings 52 in the skirt 51, passed through an opening 53 through the shaft 38, and out the other skirt opening 52. Then cotter pins 54 are passed through each end of the lug 40 outside the skirt 51, to hold the parts in place.

With this assembly in operation, the lug 40 must engage both notches 41, 42 or neither one; it cannot engage only one notch. The operator can easily feel his way to the correct connection.

The drain valve H comprises a housing 59 preferably aligned with the spout 32, a valve seat 60 like the valve seat 12, and a valve closure member 61 like the closure member 15. The screw 62 (like the screw 16) is threaded into a spider 63 (like the spider 13). A handle 64 is secured to the outer end of the screw 62, and a deflector disc 65 is secured between the handle 64 and the closure member 15. The deflector disc 65 extends radially beyond the valve closure member 61 and is provided with a generally cylindrical skirt 66 that extends back around and generally concentric with the housing 59, and these members 65 and 66 serve to deflect the water that comes out when the valve H is opened, to prevent its spurting out against the operator.

It will be noted that the valve C closes against the water pressure in the main; that is, the closure member 15 has to move against the pressure of the water in order to come down onto the valve seat 12. Conversely, the valve C opens with the pressure; that is, the closure member 15 moves in the same direction as the water pressure when it moves away from the valve seat 12. This fact is important for it means that when connecting or disconnecting the crank F from the notches in the socket G the pressure is off in the housing 30. Thus when the valve C is closed, the pin 40 may be freely inserted or removed from the notches 41, 42 by holding the crank shaft 38 in a rotational position with the pin 40 between the arms 24, 25. The sleeve or skirt 51 aids in aligning the lug or pin 40 between the arms 24, 25 and then, on rotating the handle, the pin 40 will enter or move out of the radial notches 41 and 42. When the pin 40 has been inserted in the notches 41, 42 and when the handle F has been turned counterclockwise so as to open the valve C, the pin 40 will be lifted into the upper axially extending portions 43, 44 of the notches by the water pressure action on the crank portion 38. As this water pressure increases, it becomes practically impossible to disengage the hydrant handle F from the socket G and this is true so long as the water pressure is on.

With this novel connection, no axially applied manual pressure on the crank F is required when operating the valve C. The operator does not have to push in on the handle, as he did with prior art valves. All he has to do is to rotate the handle F in the desired direction to open or close the valve C. There is no risk of losing connection between the crank F and the stem socket G, whereas in the prior art he was constantly fighting the water pressure in the housing. In contrast, the hydrant becomes an integrated unit so long as the water pressure is on; yet when the water is off, the hydrant can be disassembled, and the upper portion and its crank may then be moved quickly to another valve location along the water main. The positive connection during the times the valve is being operated, and the simple disconnection when the valve is closed are important advantages obtained by the present invention.

In addition to being an aid to proper positioning of the lug 40 and the socket 25, an important function of the skirt 51 is to align the hydrant housing 30 with the valve C and its housing 11. When the pipe leading out of the hydrant spout 32 is full of water, there is quite a large force tending to tip the hydrant housing 30 on the valve housing 11 (to the right with the device as shown in the drawings). The skirt 51 engaging the U clip or socket 25 is effective in overcoming this tendency and prevents substantial misalignment.

When water remains in the valve housing 30 after the valve 12, 15 is closed, the hydrant cannot normally be detached nor can the pipe be detached from the hydrant spout, until most of the water has been drained out. In this invention, the draining is very simple. The handle 64 is turned, moving the closure member 61 away from the drain valve seat 60, and the water then runs out, being deflected by the plate 65 and its skirt 66, so that it does not interfere with the operation of the valve 60 nor get the operator wet.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

In a separable hydrant of the type adapted for quick separation of a portable cover portion from a base portion, the base having a valve seat with an adjacent spider, a movable valve member adapted to engage said valve seat and having a cap screw extending through said valve member and threaded into said spider, and an actuator; the cover portion having coupling means for engagement with said base and an actuating lever for engaging said actuator to operate said valve member; the combination therewith of complemental severable connecting means, one on said actuator comprising a U-shaped member engaging the head of said cap screw in a non-rotating fit, each of its legs having a radial engageable latch portion with an axial notch extending away from said valve, said radial portions extending in from opposite edges of said legs, and a transverse pin on said lever adapted to engage said latch whereby said lever's pin will move into said axial notch, thereby enabling said lever to move said valve seat and to resist internal forces arising from fluid pressure tending to separate said lever from said actuator; and a cylindrical sleeve secured around said lever and having diametric openings through which said pin passes, for encircling said latch to secure proper engagement thereof.

References Cited in the file of this patent

UNITED STATES PATENTS

| | | |
|---|---|---|
| 480,313 | Bachelder | Aug. 9, 1892 |
| 972,384 | Kellar | Oct. 11, 1910 |
| 1,287,128 | Snow | Dec. 10, 1918 |
| 1,455,406 | Nicolaides | May 15, 1923 |
| 2,051,919 | Tow | Aug. 25, 1936 |
| 2,589,321 | Anderson | Mar. 18, 1952 |